United States Patent
Osmundsvaag

(10) Patent No.: US 6,672,234 B2
(45) Date of Patent: Jan. 6, 2004

(54) AIR CUSHION VESSEL

(75) Inventor: Arne Osmundsvaag, Asker (NO)

(73) Assignee: Effect Ships International AS, Sandefjord (NO)

(*) Notice: Subject to any disclaimer, the term of this patent is extended or adjusted under 35 U.S.C. 154(b) by 0 days.

(21) Appl. No.: 10/136,769

(22) Filed: Apr. 30, 2002

(65) Prior Publication Data

US 2003/0159637 A1 Aug. 28, 2003

(30) Foreign Application Priority Data

Feb. 22, 2002 (NO) .......................... 20020867

(51) Int. Cl.[7] .................................. B63B 1/34
(52) U.S. Cl. .................................... 114/67 A
(58) Field of Search ........................ 114/67 A

(56) References Cited

U.S. PATENT DOCUMENTS

| | | | | |
|---|---|---|---|---|
| 3,618,552 A | * | 11/1971 | Grihangne | 114/67 A |
| 3,877,408 A | * | 4/1975 | Crowder | 114/67 A |
| 3,968,763 A | | 7/1976 | Mason | |
| 4,165,703 A | | 8/1979 | Burg | |
| 4,227,475 A | * | 10/1980 | Mattox | 114/67 A |
| 4,393,802 A | * | 7/1983 | Rizzo | 114/67 A |
| 4,429,652 A | * | 2/1984 | Stol | 114/20.1 |
| 4,574,724 A | | 3/1986 | Stolper | |
| 4,587,918 A | | 5/1986 | Burg | |
| 4,890,564 A | | 1/1990 | Burg | |
| 4,989,534 A | * | 2/1991 | Field | 114/289 |
| 5,000,107 A | | 3/1991 | Burg | |
| 5,140,930 A | | 8/1992 | Lund | |
| 5,176,095 A | | 1/1993 | Burg | |
| 5,273,127 A | | 12/1993 | Burg | |
| 5,415,120 A | | 5/1995 | Burg | |
| 5,454,440 A | | 10/1995 | Peters | |
| 5,570,650 A | * | 11/1996 | Harley | 114/61.2 |
| 5,611,294 A | | 3/1997 | Burg | |
| 5,746,146 A | | 5/1998 | Bixel, Jr. | |
| 5,860,380 A | * | 1/1999 | Burg | 114/67 A |
| 5,989,082 A | * | 11/1999 | Corliss | 440/45 |
| 6,220,193 B1 | * | 4/2001 | Dilks | 114/67 A |
| 6,293,216 B1 | | 9/2001 | Barsumian | |

FOREIGN PATENT DOCUMENTS

| | | |
|---|---|---|
| EP | 0 228/ 306 | 7/1987 |
| EP | 0 338 475 | 10/1989 |

* cited by examiner

*Primary Examiner*—S. Joseph Morano
*Assistant Examiner*—Andrew Wright
(74) *Attorney, Agent, or Firm*—Knobbe, Martens, Olson & Bear, LLP

(57) ABSTRACT

A high-speed marine vessel, the weight of which is supported by a combination of hull elements including planing surfaces, displacing volumes, air cushions, and, at high speeds, also surfaces that are affected by aerostatic and aerodynamic pressure. The size and arrangement of the hull elements are designed to achieve a larger effect for respective lifting and motion damping properties in order to give the vessel advantageous characteristics of speed, resistance, and behavior in waves.

10 Claims, 11 Drawing Sheets

Fig. 11.

Symbols:

| | | | |
|---|---|---|---|
| Single-hull without prop. | Hull with propulsion-hull inside air-chamber | Hull with propulsion-hull each side of single-hull | Hull with separate propulsion hull between the single-hulls |

Monohull – variants:

Multihull – variants:

AIR CUSHION VESSEL

BACKGROUND OF THE INVENTION

1. Field of the Invention

The invention relates to the field of water craft and, in particular, to a high speed vessel which is supported by a combination of static air pressure, dynamic lift, and aerodynamic ram-effect.

2. Description of the Related Art

The idea of creating a thin layer of air between the water and the surface of a vessel's hull is not new. The intention is to reduce the friction component of its resistance. The difficulty has proven to be the distribution and control of the airflow. An alternative design is that the vessel also be carried on a pressurized air cushion, at the same time as fiction is reduced.

Many of the presented and patented inventions based on the above ideas lack a description of an overall concept for the invention. Certain inventions related to air cushion vessels demonstrate advantages within limited applications, but at the same time have disadvantages that make them unsuitable for commercial use. For example, they lack a description of how the claimed advantages could be maintained in the sea conditions that could be expected. Far too little consideration has been given to the combination of the requisite comfort, maintenance of speed in waves, reliability and limited maintenance, with high speed and low resistance—requirements that must all be satisfied to produce a commercially successful application.

Usual characteristics of previously presented solutions for air cushion vessels are that;

- they focus on methods—often theoretical—for improving efficiency by reducing the frictional resistance of the hull when moving in still water
- they assume a high level of aerostatic lift
- the projected area of the air chamber is often larger than necessary for the displacement (because the size is determined by the arrangement)
- the shape in plan view of the air chamber is usually rectangular
- they require larger fans to maintain cushion pressure and airflow
- the operation is sensitive to sea conditions and the method of sue, their motion is easily affected by passing waves
- they have a shallow draught and large air leakage, particularly in waves
- they have low hydrodynamic damping at speed
- they have comparatively small reserve displacement to be able to counteract changes in trim
- the hulls are extremely mechanically complex and are complicated to manufacture, which makes construction expensive
- they require complicated control systems, and contain construction elements that lead to considerable maintenance costs and give less reliable operation On both hovercraft and SES, the air cushions have been contained by flexible enclosures, called "skirts". These have proven to be susceptible to wear and damage, and required regular replacement, in SES particularly the fore skirt. The small number of vessels built has led to spares being expensive. Using flexible skirts involves continuous air leakage under the skirt, although in controlled amounts. The airflow leads to additional energy consumption and an increase in the total power required for propulsion. Large variations in the leakage cause pressure fluctuations/pressure drop in the supporting air cushion, which can lead to considerable variation in the hull resistance and vibrations in the vessel (reduced comfort). A shallow draught when the vessel is cushion borne increases the likelihood of air leakage in a seaway. On hovercraft and SES, the forward skirt section projects an appreciable and blunt surface in the direction of motion, which, in a head sea and bow wave, can give rise to a relatively large increase in the resistance, i.e. a considerable reduction in speed. Waves that hit the skirt cause pressure variations in the air cushion, which are transmitted to the vessel and reduce the ride comfort.

Several inventions have been put forward in which flexible enclosures of the air cushion are totally or partially replaced by rigid ones, e.g. by Burg, Barsumian, Harley, Bixel, Peters and Stolper, for use on single and multihull vessels. Barsumian, Bixel and Harley combine a limited amount of dynamic lift (depending on speed, deadrise, trim and surface) on a (preferably forward) hull section in contact with the water, with aerostatic lift (air cushion), mainly located in the aft portion of the vessel. When planning, these inventions try to achieve a minimum of hull surface in contact with the water, in order to reduce the frictional resistance. Burg and Bixel extend the air chamber along almost the entire length of the hull at the water line. (Peter's idea is a conventional SES, in which the invention comprises a moveable, athwartships division of the cushion chamber, which can be activated for motion control.). In Stolper's idea, the intention is that the wind created by the movement of the vessel will be used for natural ventilation/air lubrication of planning, supporting surfaces, rather than the air cushion technique. The other inventions mentioned require forced ventilation (fans). A common factor of the above vessel solutions is that they have a minimum of hydrodynamic and hydrostatic (reserve displacement) lift and motion damping in relation to that which is needed to create a seaworthy vessel, and that they are primarily designed to reduce the wetted area, i.e. frictional resistance. Several inventions (in particular those of Burg) are considerably complex, demanding increased maintenance to provide reliability.

Vessels supported on air cushions are propulsively more efficient at high speeds than displacing and planning vessels. For devices intended for propulsion by contact with the water, high speeds involve hydrodynamic complications (cavitation, reduced efficiency, erosion damage), which can increase further due to air leakage from the cushion, which in turn is dependent on the vessel's position in the water/trim at speed. Sporadic ventilation of the propulsive device gives rise to torque and pressure fluctuations, which in turn can cause operating damage to the gears and engines.

Consequently, almost all of the ideas described above require propulsion using surface-piercing propellers (the blades of which have a fully ventilated suction side) as shown in figures in the respective patents. Unless stated otherwise, surface-piercing or air propellers are used. For moderate speeds, also a conventional propeller can provide propulsion.

Experience has shown that surface-piercing propellers have a shorter operating life than conventional propellers. Variation of blade immersion in the water can easily lead to load variations in a seaway, for both propeller and engine, which necessitates a dynamic regulation system. Precise regulation of the blade immersion is also necessary during acceleration and when passing the "hump speed," not to overload the engine at low revs. Too high a torque can easily lead to the vessel not being able to reach full speed ("gets stuck on the hump").

Only Burg refers in one of his patents to the possibility of using water jet propulsion, but puts the water inlet in an unsuitable position for its function, and does not develop propulsion alternatives further. The mixture of air into the water usually results in a greater likelihood of cavitation, thrust reduction, propeller ventilation and reduced propulsion efficiency. The surface-piercing propeller is the best choice, as it is designed for these conditions, and thus works at high speeds. However, it has poor characteristics during low speed maneuvering and when reversing, which increases maneuvering time in harbor. This, plus large load variations in the propulsion unit, has limited its commercial application. Ordinary propellers, with wing profile blade sections, can be used up to approximately 40 knots (oblique flow when mounted on an angled shaft usually leads to erosion damage due to cavitation). Higher speeds require a propeller shaft aligned with the direction of flow, modified blade sections or fully cavitating blades with lower efficiency. Contra-rotating propellers can be around 10% more efficient than a single propeller. They can work at speeds above 70 knots, but at these speeds a slender strut and gear house are required, to reduce resistance and cavitation damage.

Air propellers could be a possible alternative for high speeds, where no other method of propulsion can be used. Burg has mentioned propulsion using air propellers in one patent.

Both surface-piercing and contra-rotating propellers have been produced for only relatively low powers, so propulsion systems that operate at high power output and high efficiency at these speeds are of the utmost interest. In practice, complicated propulsion systems have given reduced system efficiency and unreliable operation. Consequently, there is a need to develop new hull solutions, which permit the use of proven and reliable propulsion systems and which, above all, are designed to be part of an efficient total solution.

The commercially accepted and most well proven propulsion system for high-speed vessels is currently water jet (WJ) propulsion. Efficient WJ installations for powers over 20 MW and speeds approaching 80 knots currently exist, and units for up to 50 MW are under development. To date, WJ has been installed in conventional SES, but with some difficulties in avoiding air leakage from the cushion to the WJ unit, which leads to reduced efficiency and cavitation damage to the pump, and damage to the main engines as a result of load variations.

SUMMARY OF THE INVENTION

The purpose of the invention is to specify the design of a vessel hull that combines air cushion technology and improved propulsion efficiency with increased comfort, good maneuverability, good stability and safety, in both still water and normal sea and operating conditions, to provide an effective total solution that also satisfies the demands of commercial application.

The idea behind the invention is suitable for application in both monohull and multihull vessels, for both military and civilian use, to an extent that is based on how each vessel is used. The idea as such is not restricted to any absolute vessel size; it is practical considerations like the strength of the building materials, hull weight, available fan capacity, existing propulsion system etc. that limit the application. It is also expected that the relative speed will normally be limited to a group of vessels with service speeds in relation to vessel length that are higher than that expressed by a length Froude number of approx. 0.6. This is comparable with the speed range for such vessels, which are normally referred to as "semi-planing" and "planing".

Experience from previous air cushion vessels shows that, with a smaller cushion area and a moderate air pressure, it is possible to support the same proportion of the vessel's displacement as a hovercraft or an SES. This, combined with the fact that it is possible to divide the air cushion between two or more hulls, can be used to make each air cushion hull and air cushion chamber slimmer (greater length/width ratio) than for conventional air cushion vessels, so that the hulls have a reduced resistance, are more seakind and seaworthy, and create a safer vessel with greater comfort and less speed reduction in waves. The same conditions can be used to combine the air cushion hull with a more conventional, planing forebody, which has the combined job of confining the air cushion using a rigid construction, generating a limited dynamic lift in addition to the lift of the air cushion, containing reserve displacement for large vessel motion and generating a damping of this motion.

The proposed invention is also expected to suffer less speed reduction in a turn than a conventional SES, because: here is better confinement of the air cushion using rigid side walls, which go below the water surface, around the cushion chamber and the bow and stern planing surfaces counteract changes in the vessel's trim, which reduces the likelihood of air leakage from the air cushion, which would lead to the vessel sinking lower in the water, increasing the resistance.

A feature that distinguishes this invention from other solutions is that the supporting air cushion hulls will be combined with hull sections called propulsion hulls, which are integrated into the vessel. These are specially intended to house the propulsion units for the vessel. The propulsion hulls will be specifically—although not exclusively—designed to use the most well proven and accepted propulsion system for high speed and high power, i.e. water jet propulsion. Other propulsion systems can also be used with the above hull configuration. The propulsion hulls will also be designed and located with regard to the behavior in waves of the air cushion hulls, although they themselves affect the seagoing characteristics of the vessel. In addition inherent resistance of the propulsion hulls will be taken into consideration, as well as how they alter the pressure interference between the hulls. This could lead to the propulsion hulls being designed with both a typical planing hull shape and dimensions, and with an almost purely displacing hull shape (round bottom) and dimensions, depending on the conditions the concept is to be adapted for.

In comparison with hovercraft and SES, this invention provides greater freedom to balance the lifting capacity of the air cushion, the vessel's planning and displacing hull elements and the wetted area of the vessel (frictional resistance) against improvements in other characteristics, such as comfort and speed reduction in waves, and also to adapt the vessel for proven and reliable propulsion systems, e.g. water jet propulsion. By the choice of the plan form of the air cushion, in combination with partially adjustable surfaces for generating dynamic forces, it is possible to achieve a better balance between weight distribution and the design of the vessel, in order to improve the seakeeping characteristics and create passive hydrodynamic motion damping, which is normally not present in other air cushion vessels.

In multihull applications—depending on the geometry—there is often a reduced air flow velocity, and thus increased static air pressure in the constriction between the hull, wet deck and water surface (ram effect). For small vessels and high speeds, the resulting aerostatic lift can be considerable. In the proposed invention, it is intended that it will be possible to regulate the pressure using a device to restrict the airflow. The device comprises an inflatable elastic bag or bags, connected to each side hull and the wet deck. The bags control the cross section of the air channel, the flow velocity and pressure rise, and thus make it possible to optimize any reduction in the total resistance of the vessel. The aerostatic lift on the vessel, and the resulting reduction in the water resistance, must be weighed against the total increase in the air resistance for the vessel which is also considerable at high speed when the air velocity is reduced.

For high payload and/or low draft operation a second elastic bag system may be fitted to enclose the gas volume between the demihulls in the bow. The resulting center air cushion may be pressurized with a separate fan system to give additional lift/payload capability and/or reduce draft.

The basic configuration of the solution has fewer moving parts, resulting in less maintenance. The systems that are being proposed in developments of the idea are of a type that allows the basic concepts to work even when they are not operating, which increases reliability.

The recommended arrangement makes it easier to find space to install a motion damping system (e.g. a hydrofoil system), if this should prove necessary, than is the case in a hovercraft or SES.

The invention comprises a vessel hull, which is supported by a combination of static air pressure (an air cushion), dynamic lift (planing hull section), aerodynamic ran-effect (in multihull applications) in combination with additional hull sections (some of which are planing and some of which are displacing) designed to improve the stability, forward motion and seakeeping characteristics of the vessel, house efficient propulsion units and reduce the resistance of the vessel, not only in calm water but equally in waves. The idea of the invention can be used for both monohull and a number of multihull vessels described below, intended for high relative speeds.

In comparison with hovercraft and surface effect ships (SES), this invention provides greater freedom to balance the lifting capacity of the air cushion, the vessel's planing and displacing hull sections and its wetted area (frictional resistance) with improvement of other characteristics, such as comfort and speed reduction in waves, and to adapt the vessel for proven and reliable propulsion systems, such as water jet.

By selecting the plan form of the air cushion in combination with partially adjustable surfaces for generating dynamic forces, it is possible to achieve a better balance between the vessel's weight distribution and shape, in order to obtain better seakeeping characteristics, and create passive hydrodynamic motion damping, which are normally not present in other air cushion vessels.

Another preferred embodiment is a multihull vessel as described above, constructed for high payload to size ratio and/or low draft operation, where the volume between the side hulls are enclosed with an enclosing arrangement as mentioned above at the aft end of the tunnel, and a similar simi-flexible enclosure arrangement at the bow of the vessel. The resulting volume is pressurized with a separate fan system, of a similar type as outlined above, to give air cushion lift from this arrangement in addition to the air cushion lift from the within the demihull located aircushions. The cushion pressure of the center cushion will normally be approximately 50% of the pressure in the cushions in the demihulls. The arrangement can be shut off if required.

The deck structure of the mentioned vessel is characterized in that the underside of the deck structure—the wet deck—will normally be fitted with a volume body, positioned symmetrically around the vessel's fore and aft plane of symmetry, with the purpose of reducing water impact on the wet deck and providing reserve buoyancy in the event of diving.

Another preferred embodiment of the vessel hull according to the invention is a vessel hull as the one described above, but in which the propulsion hull is a separate, symmetrical hull, positioned between the single hulls, and in which the single hulls can be symmetrical or asymmetrical.

Another preferred embodiment is a vessel hull in which the propulsion hull is a separate, symmetrical hull, positioned between the single hulls, and in which the single hulls are asymmetrical, and where the width of the propulsion hull is equal to the distance between the inner sides of the single hulls. The bottom of the forward part of the propulsion hull is connected to the forward planing bottom surfaces of the respective single hulls. The propulsion hull is of equal length or longer than the single hulls and extends ahead of the foremost end of the single hulls.

Another preferred embodiment is a catamaran in which propulsion hulls are located inside the air cushion chamber of each single hull and in which the single hulls are symmetrical. These propulsion hulls comprise two planing bottom surfaces, connected to one another in a fore and aft plane of symmetry, two side surfaces, which are connected to the bottom surfaces and which form an acute angle with an arbitrary vertical plane, and a transom surface that is a transverse plane relative to the fore and aft direction of the vessel. The transom will be in a fore and aft position that is in or near the transom of the air cushion hull. The propulsion hull is connected to the roof of the air cushion chamber.

Another preferred embodiment is a catamaran in which propulsion hulls are located inside the air cushion chamber of each single hull, and in which the single hulls are symmetrical.

The invention further comprises a water lock installed in the step at the fore containment surface of the air chamber, in order to limit leakage from the air cushion. This comprises blowing out water at high velocity (impulse), vertically or obliquely aft in a sheet along the boundary line of step along the bottom surface of the vessel. The jet of water forms an angle between 0° and 90° with a vertical plane, across the fore and aft direction of the single hull, but preferably 60–70°. This will preferably be used in a seaway, and it should be possible to shut it off.

Another preferred embodiment of the invention comprises an air lock of the same design and function as described above, but in which water is replaced by air.

Another preferred embodiment is a catamaran with a groove between the inner side of each single hull and the vertical side of the corresponding propulsion hull, and in which this groove is intended to collect air that leaks over the inner side of the bilge keel of each single hull.

Another feature of the invention is a vessel fitted with stepped volume bodies in the fore body, positioned on one or both sides of the single hulls above the planing bottom surface, to provide reserve buoyancy and to deflect water from the sides of the hull, and as a result reduce the water pressure on the wet deck.

Another preferred embodiment of the invention is a vessel in which the cushion chamber in each single hull is divided up by, mainly vertical, solid or perforated bulkheads, ruining fore and aft and athwartships, which extend from the ceiling of the cushion chamber down to above the water surface, which forms the lower containment surface of the air cushion, in order to limit the speed of the pressure equalization that takes place when air leaks from the cushion or from one or more bulkhead sections. Each section can have a separate air supply.

Other preferred embodiments are multihull vessels, in which there are more than two single hulls, i.e. three, four, five or more, and in which the propulsion hulls are positioned on the side or sides of each single hull, or as separate propulsion hulls between the single hulls, and/or with propulsion hulls located inside each cushion chamber, or with a combination of side-connected and separate propulsion hulls between the single hulls or inside the cushion chambers, on the same principles described above.

Another preferred embodiment is a multihull vessel as described above in which the cushion pressure in each symmetrically positioned pair of single hulls can be regulated separately, in order to counteract an external heeling moment acting on the vessel.

Another aspect of the invention comprises a vessel with two or more air cushion hulls, in which the fans are connected together by air ducts within each hull and/or between the hulls, so that if one fan breaks down, another fan will be able to compensate for its air supply, so that the air cushion concept continues to operate, albeit to a lesser extent. Normally, with all fans running, all of the connecting ducts will be shut off at both ends by valves located at the outlet of each fan.

Another preferred embodiment comprises a vessel hull comprising just one single hull (monohull), in which the propulsion hull is located inside the cushion chamber of the single hull, and in which the single hull and the propulsion hull are symmetrical.

Another preferred embodiment comprises a vessel comprising just one single hull (monohull) with two propulsion hulls connected to either side the single hull and having grooves, as described above. Another embodiment further comprises in addition a symmetrically positioned propulsion hull inside the air cushion chamber of the single hull.

Other preferred embodiments comprise vessels in which the length of the air chamber in each single hull, from the transom to the step, makes up between 45 and 85% of the length of the hull.

Another aspect of the invention is a multihull vessel with a high propulsion-speed to weight ratio, in which aerostatic lift on the wet deck is used (ram-effect); and which has an arrangement comprising at least one air restricting device an inflatable elastic bag or bags, which is/are connected to either side hull and the wet deck, in order to control the airflow and pressure build up, in order to achieve the balance between lift and air resistance that reduces the total resistance of the vessel. The at least one air restricting device can e.g. comprise an inflatable bag or bags. The inflatable bag car bags can be made of e.g., rubber and/or plastic.

BRIEF DESCRIPTION OF THE DRAWINGS

FIG. 11 shows the possible combinations of symmetrical or asymmetrical air cushion hulls with propulsion hulls, for monohull and catamaran vessels.

DETAILED DESCRIPTION OF THE PREFERRED EMBODIMENT

Figure 1:
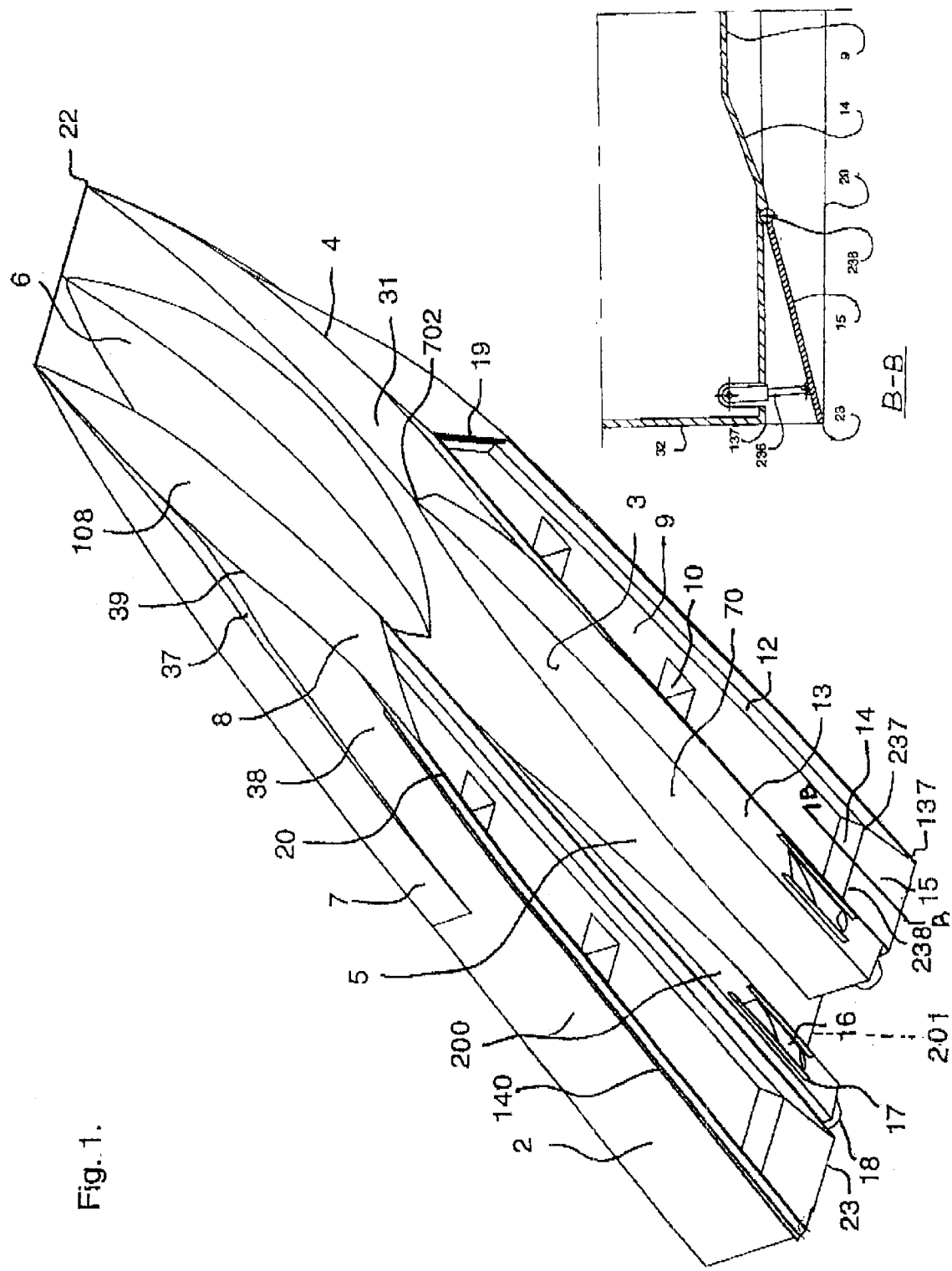
FIG. 1 shows a perspective view of an embodiment of a catamaran configuration of the invention with asymmetrical air cushion hulls, in combination with propulsion hulls positioned on the inner sides, and a side view of details of the adjustable flap that confines the aft end of the air cushion.

FIG. 1 introduces and gives a short depiction of the invention. It shows a perspective view of a catamaran 1 with asymmetrical air cushion hulls 2, in combination with propulsion hulls located at the inner sides 3, as described below.

In accordance with the above reasoning and FIG. 1, the invention in its original form comprises a twin hull vessel—catamaran 1 —with asymmetrical single hulls 200, with mainly flat inner sides 31. Each single hull comprises a fore section 8, which is made up of one or more planing surfaces, which individually or together generate dynamic lift at high speed, and hydrostatic lift at low speed and when stationary. The lowest surfaces meet at the bottom in a boundary line 4, which forms the shape of the forebody stem and is in a vertical plane with a is parallel with the center line plane 201 of the vessel.

An arbitrary athwartships section through the lowest of the forebody hull surfaces should form an angle with the horizontal plane of at least 25°, in order to limit the dynamically generated lift, reduce the risk of slamming (bottom impact), and give a smooth ride in waves. This angle should preferably be the same size on either side of a symmetrical or asymmetrical single hull, but can also be different on either side of the single hull, within the above limits.

The hull is bounded upwards by surfaces 7, 37, 38, connected to the lower planing surfaces 8, which form an acute angle (0–75°) with an arbitrary vertical plane. The planing bottom surface is bounded astern by step 19, which can be arrow-shaped or bow-shaped in its horizontal projection (plan form). In a side projection, all points on the boundary line of the step, whatever its plan form, should be in the same horizontal plane, which, when travelling at speed, should preferably be parallel to or form a small angle with the surrounding, undisturbed water surface.

Figure 2:
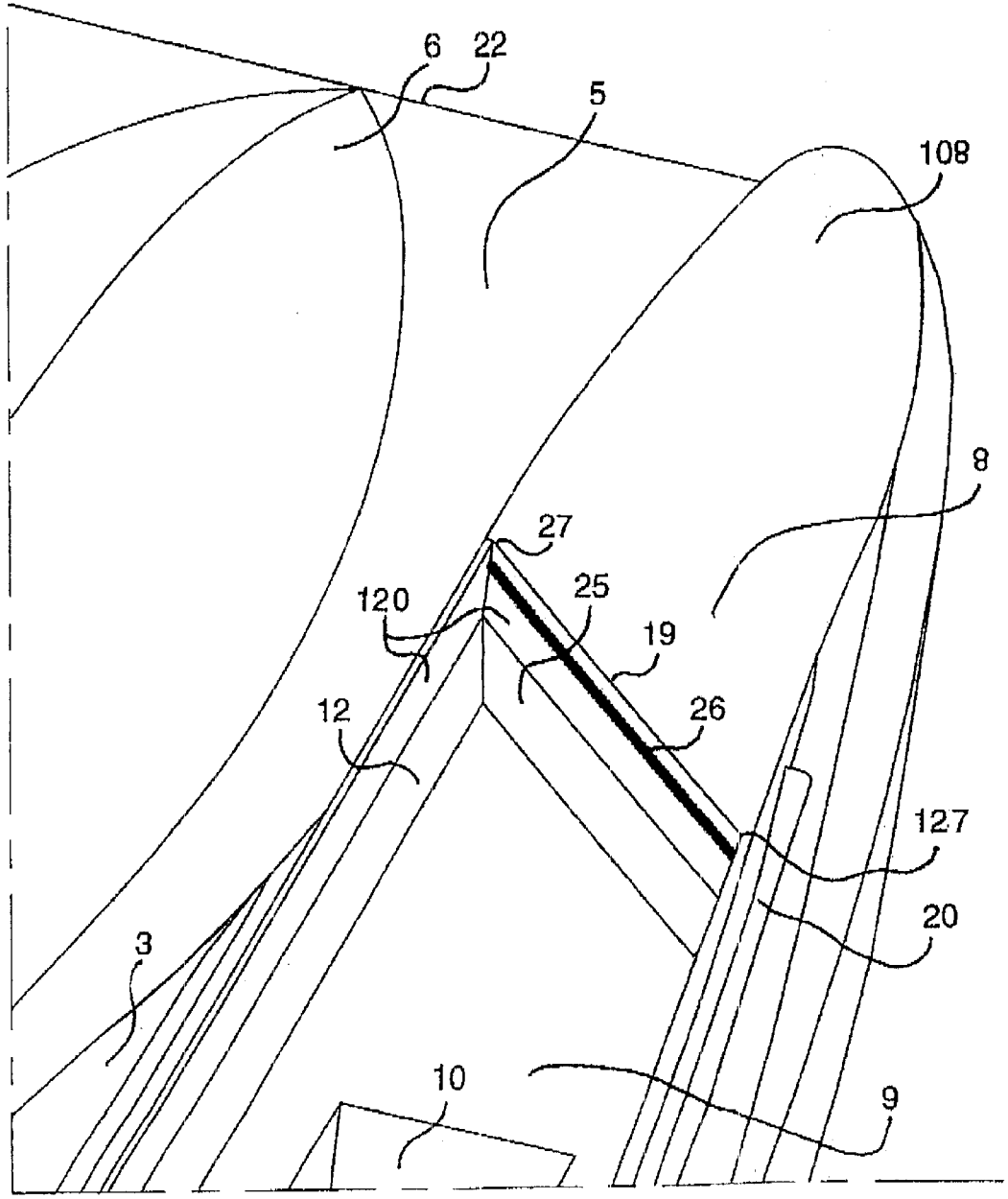
FIG. 2 shows a perspective view of the embodiment in FIG. 1 in the area around the step.

FIG. 2 shows a perspective view of the hull in the area around the step 19 of a catamaran with asymmetrical air cushion hulls 2, in combination with internally located propulsion hulls 3, as described below.

In a side view, the profile of the underside of the planing surface 8 forms an angle with the profile of the boundary line of the above step and with the water surface at speed. This angle should be greater than 3° and less than 12° but preferably around 8–10°. The intention is that the fore section 108 of the planing hull 8 will be lifted well out of the water surface at speed, in order to match both hydrostatic and hydrodynamic effects when travelling in waves. In moderate head sea and bow waves, vertical acceleration will be reduced by these means, and a reserve buoyancy will be obtained for large vessel motion. The latter also applies in stern quartering waves and following waves. In these directions, the lateral area of the forebody will be small, in order to reduce the vessels tendency to broach.

The boundary line of the aft edge of the fore planing surface at the step 19 also forms the fore boundary surface of an air cushion chamber 9, which runs after from the step 19. The length of the air cushion chamber from the transom 23 (FIG. 1) to the foremost point 27 of the step makes up most of the length of the single hull and, in the recommended configuration, makes up around 70% (65–75%) of the total length of the hull between the transom 23 and bow 22, but can be between 45 and 85% of the length of the hull, and retain function.

The air cushion chamber 9 is bounded at the sides 12 and 112 (FIG. 3), and also at its fore edge at the step 19, by preferably vertical, but alternatively, completely or partially outward sloping sides 25 and 120, which form the insides of the bilge keels 20, which extend from or just in front of the step 27 and 127 to the aftermost part 137 of the aft adjustable planing containment surface. The profile of the underside of the bilge keels, seen in a side view, will be matched to the shape the air cushion water containment surface takes when the vessel runs at stationary conditions in its design configuration. The width of the bilge keels will be as small as possible, bearing in mind the practicalities of building them and the loads they are subjected to, e.g. when docking.

At its aft section, the air cushion chamber 9 is contained by a planing surface 15, called a flap, formed by one or more flat or curved, concave or convex, surfaces, the aft (connection point) end of which is at or near the vessel's transom 23. The latter planing surface (surfaces) 15 is (are) adjustable in angle, around a primarily horizontal, athwartships axis 238 situated at the fore edge 237 of the surface, and is connected to the aftermost part 14 of the air cushion chamber 9. The mean chord of a vertical fore and aft section through the surface, between the pivot point 238 and the aftermost edge 137, forms an angle with a horizontal plane, the value of which can be chosen and varied between 0° till 25°. The position of the planing 15 surface can be fixed, be adjustable to set positions or be part of a motion control system, by which its angle and angular velocity are adjusted, depending on the dynamic behavior of the vessel.

On the outer sides of the single hull 200, the side hulls continue upwards from the lower edge of the bilge keels 20 in a voluminous hull side, in relation to a vertical longitudinal plane through lower edge of the inner sides, 12 and 120, of the air cushion chamber 9.

The planing bottom surface 8 forward of the air cushion chamber 9, and the aft flap 15 in the cushion chamber at the transom 23 are not used solely to contain the air cushion. The dynamic lift on these surfaces can be controlled to a certain extent, in order to alter the position of the hull in the water, which has two purposes:

to inhibit unwanted air leakage, both fore and aft in combination with active regulation of the air cushion pressure, regulate the size of the resulting lift (and to some extent its position)

or a combination of these.

When the angle of attack with the water of the stern flap 15 increases, the lift on the flap also increases, which produces a trimming moment on the bow that in turn increases the forward planing surface 8 and reduces its angle of attack, which increases or decreases its lifting force. The interaction between these forces affects not only the trim of the vessel, but also its vertical motion and, in a wave system approaching obliquely, also its rolling motion. The balance between these effects is obtained by correctly combining the sectional form, area and angle of attack of each stern flap 15 and the initial trim angle and deadrise of the fore planing surface 8 of each single hull 200.

In a seaway, the hydrodynamically generated lift on the stern flap 15, the forward planing surface 8 and the bottom surface of the propulsion hull section 13, at both its fore and aft sections, contribute to damping, primarily the vessel hull's pitching motion and vertical motion, but also, to a degree, its rolling motion and the combined motion. This distribution of the righting and damping forces on a number of control surfaces gives the invention a flexibility to produce the intended dynamic characteristics of the vessel.

In comparison with this invention, the conventional hovercraft and SES have very little damping effect on the pitching motion. The SES has a degree of roll damping, due to the shape of the side hulls. In general, air cushion vessels have little motion damping and righting force (trimming moment), which produces gentle, but also substantial motion, which can be devastating in high seas.

Another feature of the invention is that, primarily the inner side of the single hull 200, which faces the line of symmetry of the vessel, is developed successively, from bow to stem, into a three-dimensional body, the volume of which is greater than the corresponding outer side of the single hull. This hull section that is integrated into the vessel, called a propulsion hull 3, is intended to house the propulsion unit, preferably a water jet unit, with its water intake 16, pump housing and outlet 18, see FIGS. 1 and 3. The propulsion hull 3 is formed by a planing surface 13, comprising one or more flat or curved surfaces, and by a mainly vertical or slightly inclined surface 70 that, along its lower edge, is connected to the planing surface 13, and a transom surface 33 that is, in relation to the vessel's fore and aft direction, a mainly transverse plane. The propulsion hull is usually shorter than each single hull 200, but can alternatively have its foremost section in the same fore and aft position as the foremost part 22 of the single hull, or in certain applications even ahead of that position, and/or have its aftermost part in the same fore and aft position as the aftermost part 23 of the single hull, or in certain applications even aft of that position.

The dimensions and fore and aft position of the propulsion hull 3 relative to the side hulls 2 will be matched so that;

when water jet propulsion is used, the water intake 16 of the water jet unit is as close as possible to the position of the minimum vertical motion of the vessel when in a seaway (in order to avoid air entering the water jet unit), wherever this position is, but usually 10–40% of the vessel's greatest length in the water, from its aftermost point in the water and/or that the influence of the side hulls 2 on interference with the wave system from the nearby single hull or propulsion hull 3 is reduced and/or that its effect on the motion and acceleration of the vessel in a seaway is reduced and/or that the total resistance of the vessel configuration is reduced and/or that the maneuverability of the vessel is satisfactory It is recommended that the intake 16 of the water jet unit be shielded from the entry of air, using vertical strips 17, which are put on the outside of and along each intake 16. The strips 17 should be the same length as or longer than the intake 16. The depth of the strip 17 from the surface of the hull will be individually matched to the need for screening against the entrance of air.

Figure 3:
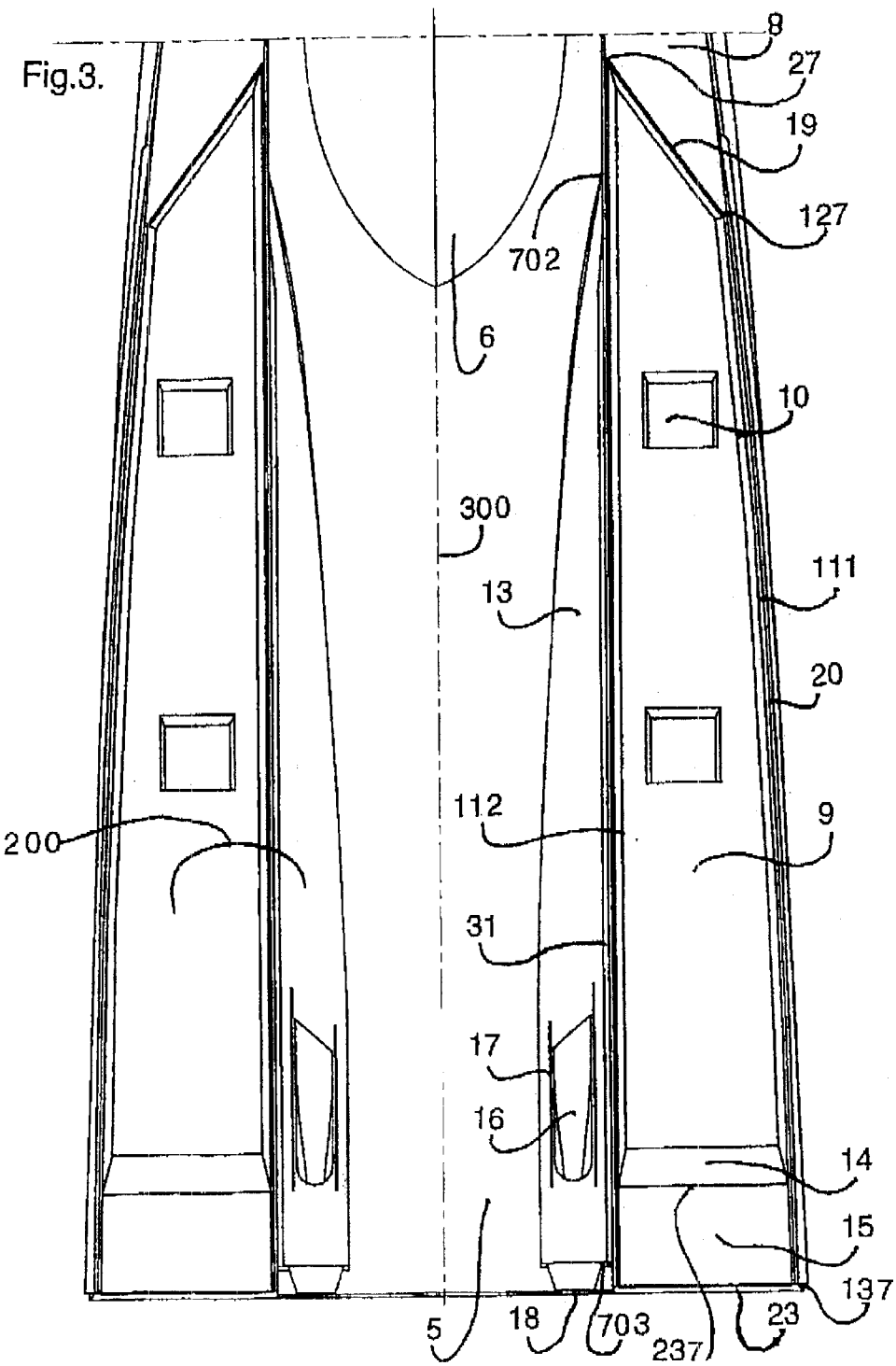
FIG. 3 shows a plan view of the air cushion chamber, its containment surfaces and propulsion hulls, according to the embodiment in FIG. 1.
Figure 4:
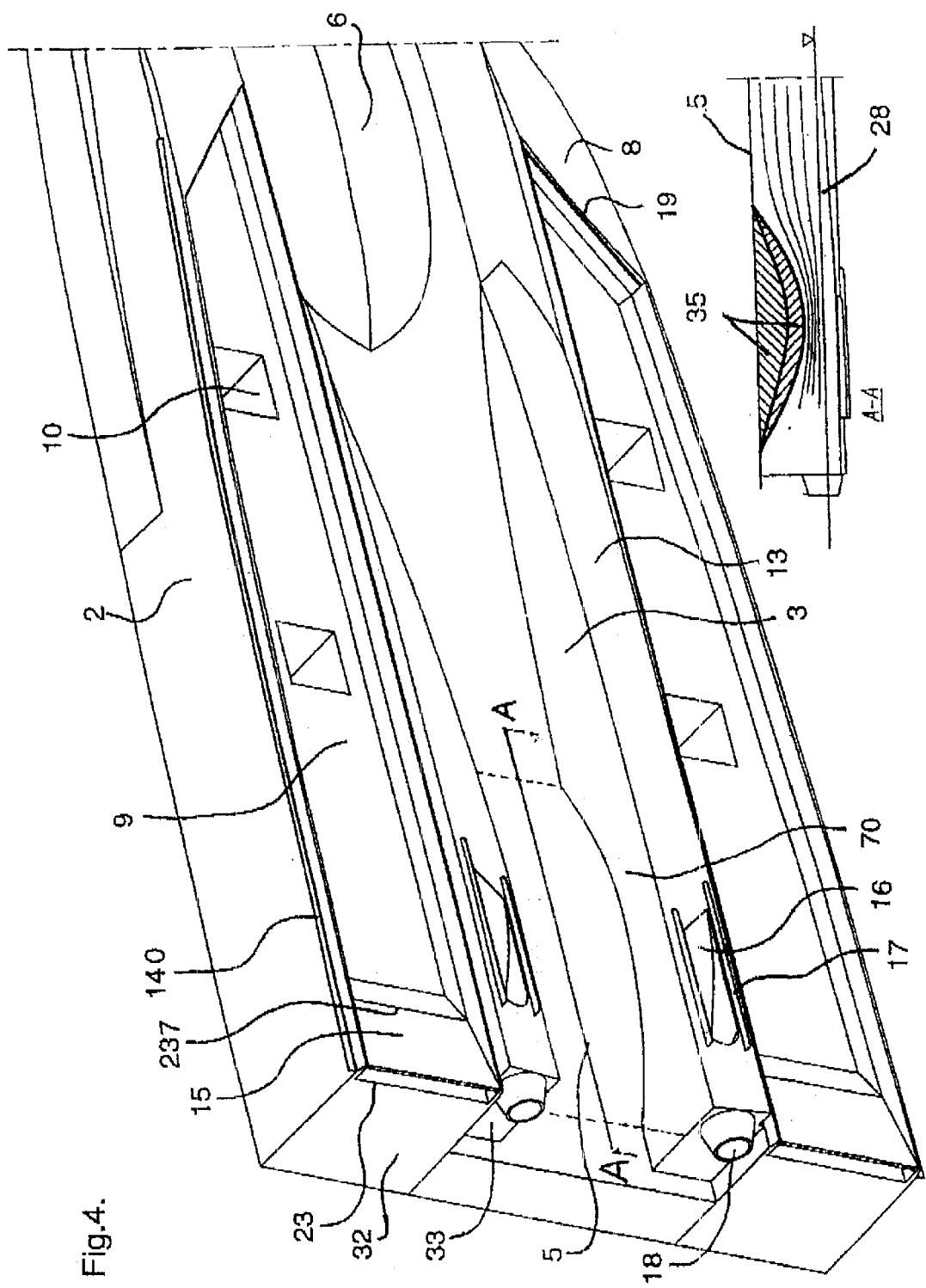
FIG. 4 shows a perspective view of the air cushion chamber and propulsion hull configuration of a FIG. 1 hull, with detail side view of the air cushion entrapment system in the aft part of the vessel.

FIGS. 3 and 4 show an example of the recommended design of the air cushion chamber 9 and its containment surfaces, for a catamaran with asymmetrical air cushion hulls 2 in combination with internally positioned propulsion hulls 3 located at the inner sides of the air cushion hulls 2.

The plan form of the air cushion chamber 9 is chosen such that the intended proportion of the weight of the vessel is supported by the air cushion, and the center of the pressure (CP), combined with the lift from the planing surfaces 8 balances the longitudinal position of the center of gravity (LCG), in order to achieve a constant position in the water. For reasons of vessel arrangement, the LCG for high-speed vessels is usually in the stern half of the hull, and astern of the longitudinal position of the center of upward force/buoyance (LCB). The idea of the invention is to create a better balance between LCG and LCB/CP. This is achieved by designing the plan form of the air cushion chamber 9 so that it is primarily wider at the stern end than at the forward end. By doing this, the center of pressure is moved aft, the static trimming moment reduced, and the intended position in the water is maintained more easily. In addition, the air chamber section 9 of the single hull is matched in a natural way to the fore, planing section of the single hull, the width of which it is desirable to limit in order to balance hydrostatic and hydrodynamic forces.

The side boundary lines 111 and 112 of the plan form of the cushion chamber at the lower edge of the bilge keels 20, will be primarily convex outwards from the center line of the single hull, but can comprise straight lines, which for a symmetrical single hull, both, and for an asymmetrical single hull, one or both, forms an angle with the center line 300, so that the distance between them is greater at the aft end of the air cushion chamber 9 than at its fore end. Such a trapezoidal design of the plan form of the air cushion chamber 9 distinguishes this proposed solution from air cushion borne solutions put forward previously, which have parallel side containment surfaces.

Figure 10:
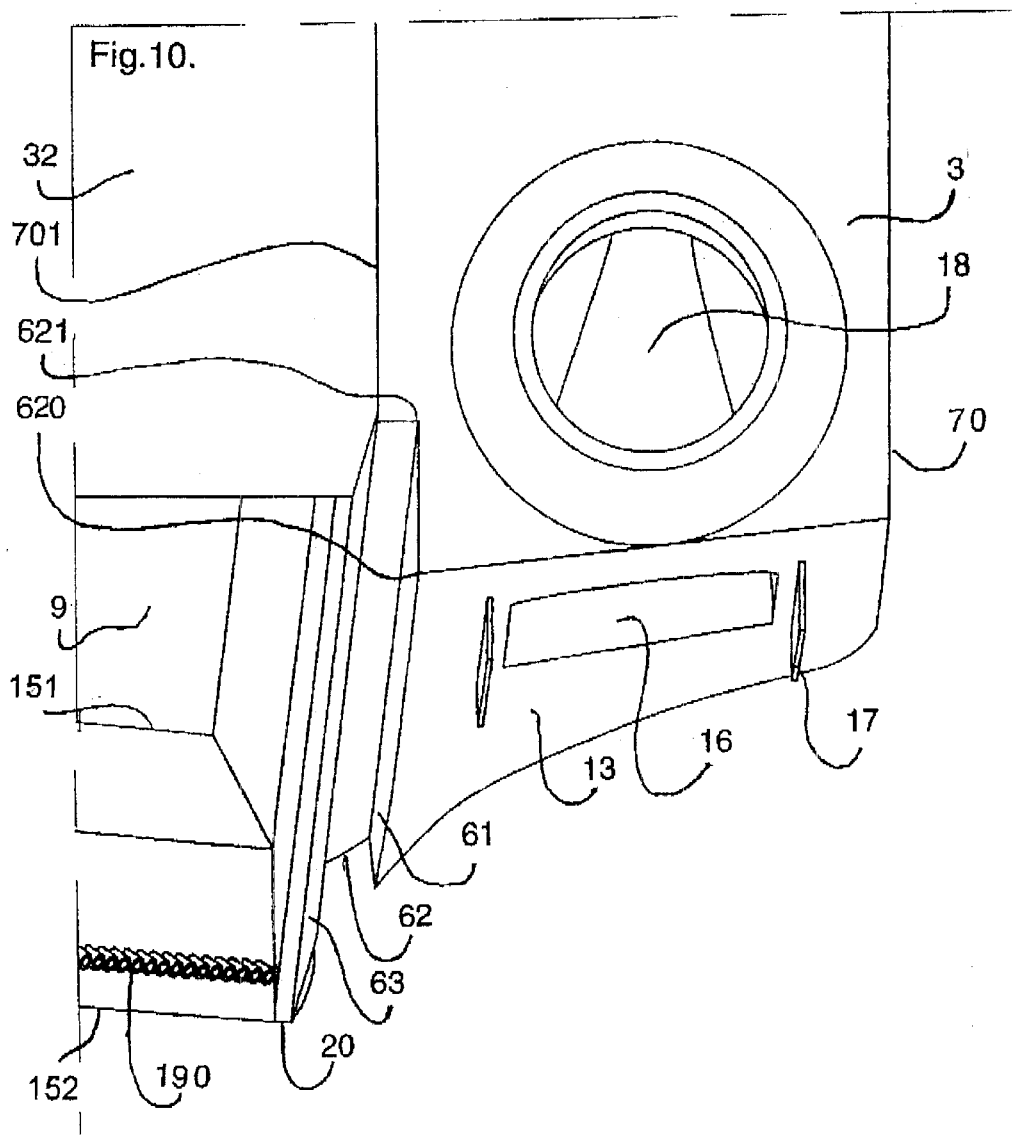
FIG. 10 shows a perspective view form the rear of a FIG. 1 hull configuration, with particularly focus on the recommended arrangement for collecting air that leaks from the air cushion chamber, in order to inhibit air entering the propulsion unit.

In an alternative application, or when optimizing for a special operating condition in which a large airflow reduces the total propulsion power, a variation of the cross section of the air cushion chamber in the direction of flow by varying the roof height of the chamber 9 is recommended, e.g. the vertical distance between 150 and 151 in FIG. 10. By doing this, the flow velocity and static air pressure can be varied, so that the fore and aft position of the center of the air pressure is matched to the desired position. It is intended that the air leakage be controlled so it will occur at the transom 23, so that some of the otherwise lost kinetic energy can be used as a supplement to propel the vessel forwards.

On the outside of each side of the single hull 200 that is not connected to a propulsion hull 3, strips 140 are attached (FIG. 1) to deflect water that flows along the side of the hull. The underside of the strips 140 will;

be more or less parallel with the water surface and form an angle with the surface of the hull that is close to 90° extend along the vessel from near the position of the step on the outside 127, to the transom 23 have a vertical position that corresponds with or is lower than the pressure head that matches the air cushion pressure, above the position of the dynamic water surface in the air cushion chamber 9 in the design configuration.

The single hulls 200 and propulsion hulls 3 are connected together by a deck structure, the downward pointing surface of which is called the wet deck 5. On the underside of the wet deck, at its fore section between the single hulls, a volume body 6 can be attached, which is intended to reduce slamming in head seas and, most importantly, provide reserve buoyancy in the event of diving in following seas. The operating conditions of the vessel will determine whether a volume body will be used and its design.

Figure 5:
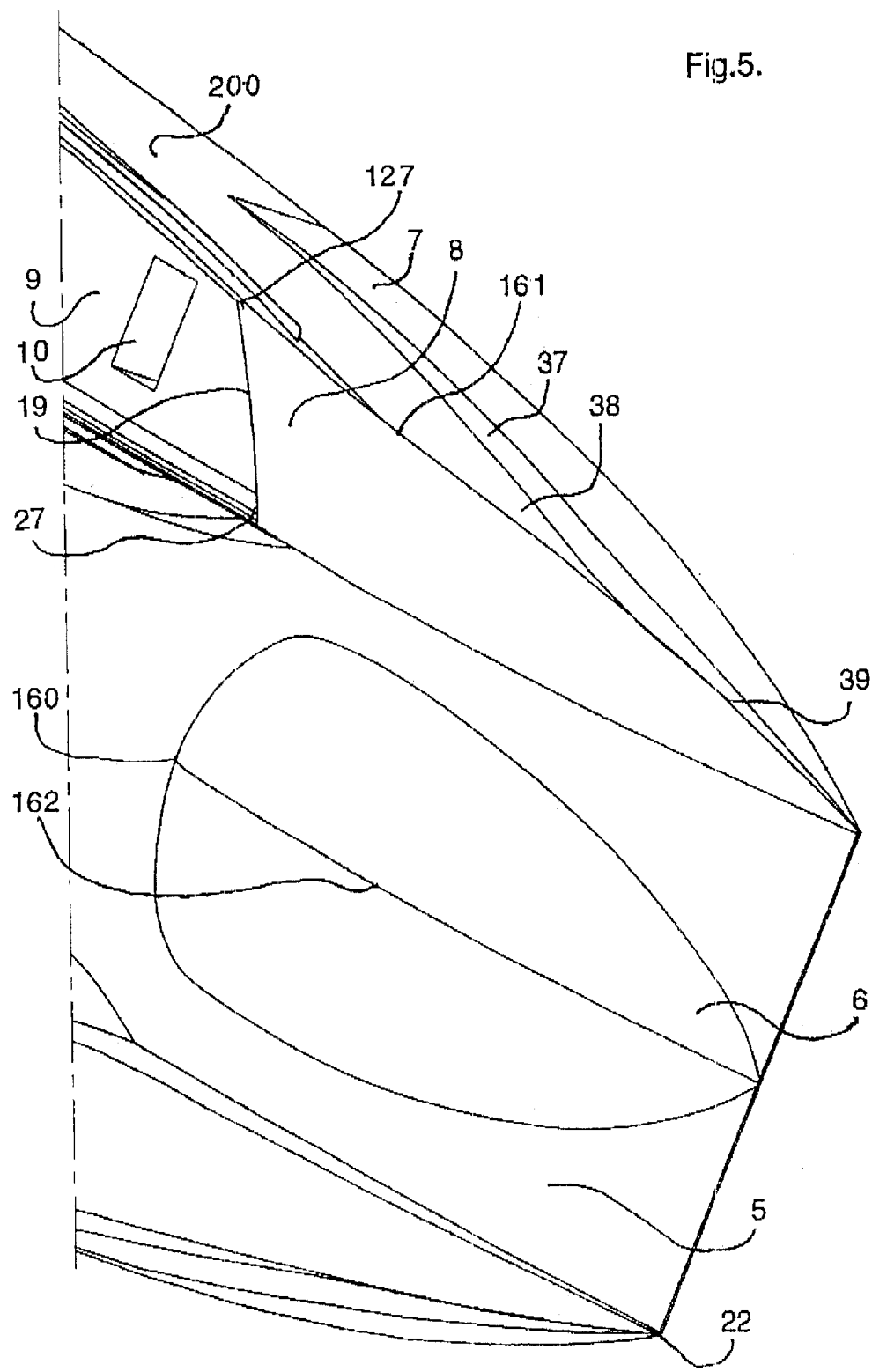
FIG. 5 shows the recommended design of the stepped fore body and center buoyancy body for a FIG. 1 hull configuration of the invention.

FIG. 5 shows the recommended design of the stepped body for a catamaran with asymmetrical air cushion hulls. A similarly shaped body can, in an alternative application, also be used on the inner sides of each air cushion hull section, in both twin and multihull applications, with body symmetrical and asymmetrical hulls.

The forebody side surfaces of the single hull 200, between the chine 39 against the forward planing bottom surface 8, 108 and the level of the wet deck 5, are fitted with a voluminous, stepped body, like a large spray rail built into the side of the hull. The intention of this body is to;

provide an additional reserve buoyancy if the forebody dives in a seaway deflect water from the side surfaces of the forebody reduce slamming on the horizontal surfaces of the wet deck.

In a fore and aft direction, this stepped body will extend from a position astern of the aftermost point 160 of the above centrally positioned volume body 6, to a position at the foremost point of the stem 22 of the single hull, and taper at both its foremost and aft sections. The mainly horizontal underside 161 of this stepped body will be at a height above the dynamic water surface, in the design configuration, which, in a fore and aft position at which the said centrally located volume body 162 is at its lowest level, should preferably be equal to half the distance between the dynamic water surface and the wet deck 5. In individual applications, the level of the lower edge can deviate somewhat from the stated guidelines.

Figure 6:
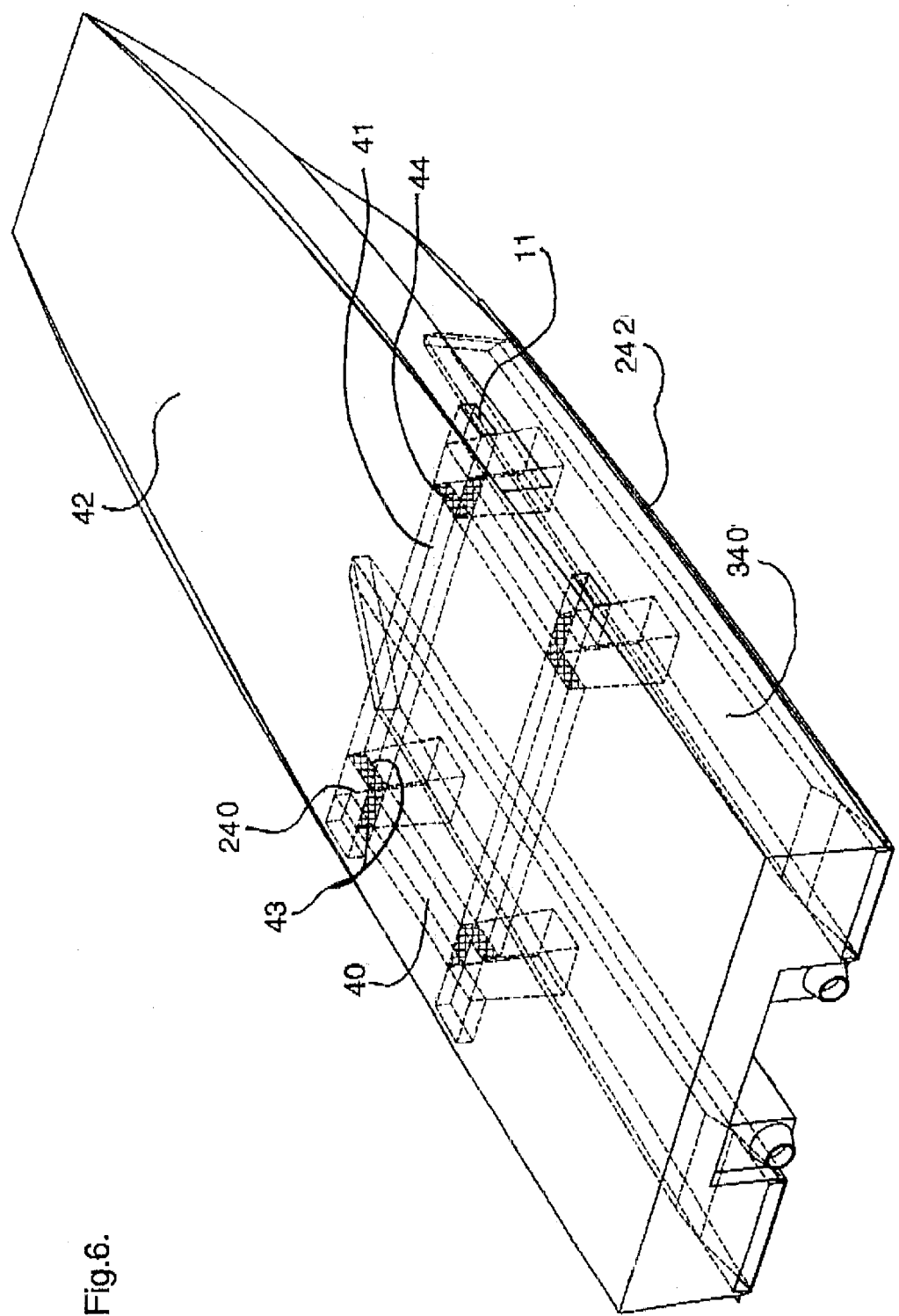
FIG. 6 shows one recommended method for connecting the fans by ducts for a FIG. 1 hull configuration.

As disclosed in FIG. 6 each air cushion chamber 9 is supplied with air from one or more fans 240 that maintain air pressure, the level of which is matched to the operating conditions, so that the vessel's air cushions can together support between 4 to 100% of the total weight of the vessel in various load conditions. For redundancy reasons, it is recommended that the fans 240 should be connected together by air ducts 40, 41 inside each hull and/or between the hulls, so that if one fan breaks down, another fan will be able to compensate for its air supply, albeit to a lesser extent, so that the air cushion concept continues to operate in stationary running of the vessel. Normally, with all fans 240 running, all of the connecting ducts 40, 41 will be shut off at both ends by valves 43, located at the outlet of each fan 240. The arrangement requires a control system 44 that allows individual regulation of pressure and volume flow, in order to inhibit the operation of one fan being affected by the operation of another.

Being able to locate fans and drive motors/engines down inside each air cushion hull 2 provides;

an advantageous arrangement with a clear main deck 42 and a simpler deck structure the ability to have better insulation of fan noise from the accommodation on the main deck 42.

FIG. 6 shows the recommended method for connecting together (if required) the fan ducts for a catamaran with air cushion hulls.

The volume of the air chamber, and thus the height of the roof 340 of the air chamber, will be matched;

to the pressure in the air cushion generated by the fans and volume of the airflow, such that the average flow velocity in the air cushion chamber 9 is regulated so that the volume of the air cushion chamber 9 is large enough so that dynamic pressure variation, caused by compression of the air cushion when running through waves is limited, in order to increase comfort on board. The latter requirement results in a considerably larger air chamber volume than the former.

In order to limit heel in side winds, it should be possible to regulate the cushion pressure in each side-positioned single hull separately, so that a righting moment is obtained, which counteracts the heeling moment of the wind.

The pressure of the air cushion is balanced by, hydrostatic pressure on the outside of the hull, which results in the surrounding water surface being higher than the lower containment surface of the air cushion. This causes resistance, due to the friction between the water and the outside of the hull. To reduce this, air lubrication of the outside of the single hull can be arranged, on a side that does not have a propulsion hull as described below. The idea of the invention is to use existing air pressure in the air cushion chamber 9, instead of a separate air supply. The part of the hull side that is in contact with the water at speed is perforated with channels, so that the outside of the hull is connected to the air cushion. The number and size of the air channels are designed such that the airflow is balanced against the ability to maintain the pressure in the air cushion. The position of the holes and their shape are chosen to obtain greater reduction of resistance in relation to the combination of air lubricated surface, with regard to hydrostatic lift of air flowing out in relation to the speed of the vessel, operation in a seaway and power lost in transporting the air.

In an alternative application, part of the hull that is in the water when the vessel is travelling at speed is replaced by a material that is previous to air, so that air resulting from the pressure difference can pass from the air chamber through the material and be evenly distributed to the outside of the single hull.

In an alternative application, it will be possible to shut off the air supply completely or partially, so that the area of air-lubricated hull surface can be controlled.

It is possible, but not essential, to divide the air cushion chamber 9 using one or more longitudinal bulkheads and/or one or more transverse bulkheads (not shown), which run from the ceiling 340 of the air cushion chamber downwards, but not so far that they come into contact with the water surface, which forms the lower containment surface of the air cushion. A such dividing plane can be solid or perforated. The intention is that each section will have a separate air supply.

The purpose of a such not shown arrangement is to:

create a flow resistance that inhibits air from flowing between the sections delay the pressure equalization between sections when one of the sections leaks air to the outside delay the pressure drop in other sections until the pressure is re-established in the leaking section reduce the fan power needed, as less air is transported.

Figure 7:
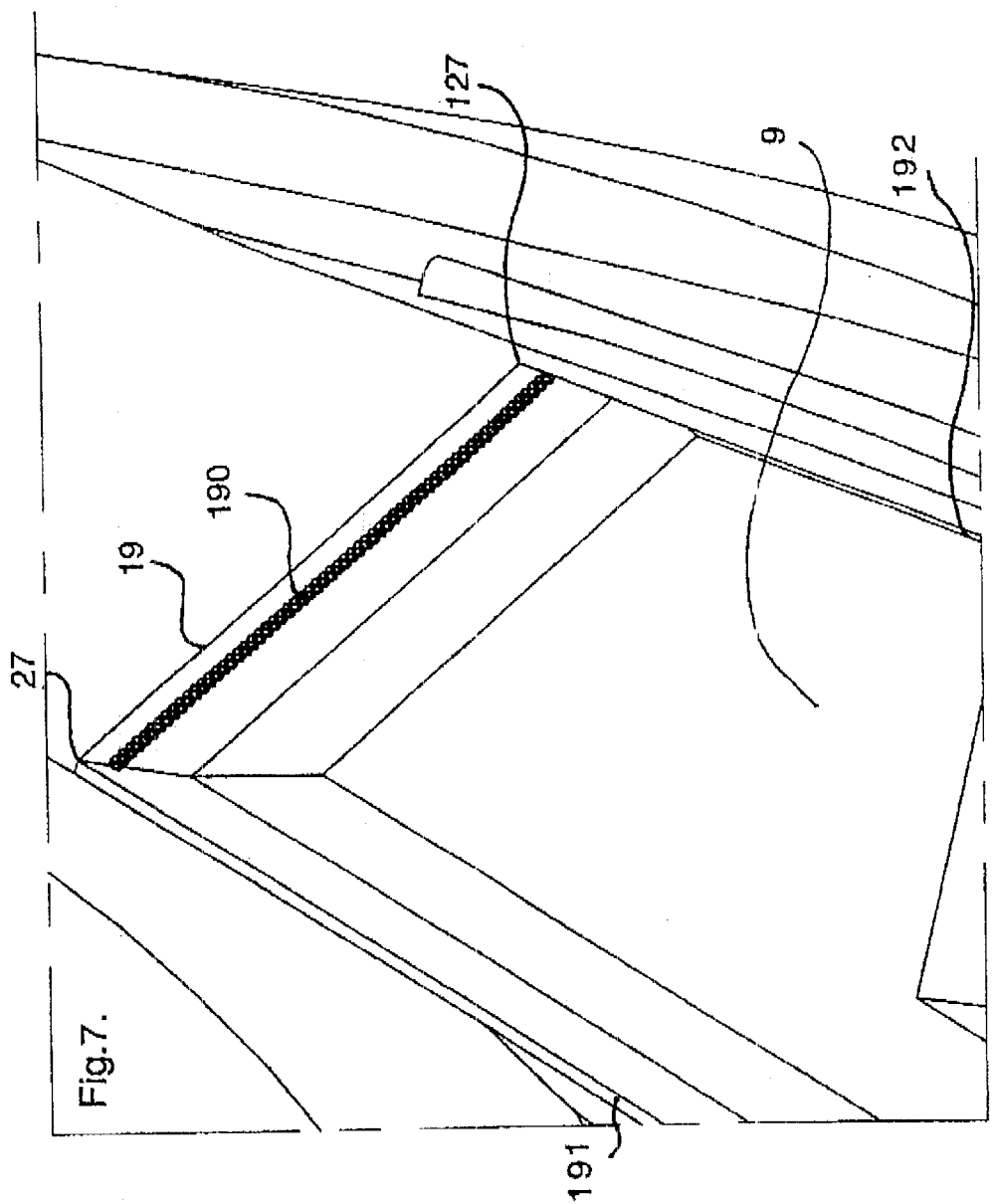
FIG. 7 shows a perspective view of the water or air lock fitted into the step of a FIG. 1 hull configuration.

FIG. 7 below shows a water or air lock, fitted in the step 19 of a catamaran with asymmetrical air cushion hulls 2, in combination with propulsion hulls 3 positioned at the inner sides thereof.

In order to further limit leakage of air at the fore step 19, i.e., at the fore containment surface of the air cushion chamber 9, a water lock 190 is fitted. This comprises blowing out water at high velocity (momentum), vertically or obliquely aft, in a sheet along the boundary line of the step 27–127, along the bottom surface of the vessel. The curtain of water thus created helps to inhibit leakage from the air cushion when the motion of the vessel in waves is so great that the step goes out of the water. In an extended application, water locks of this type are also fitted along other parts of the containment surfaces of the cushion chamber (e.g. along the surfaces between 27 and 191 and between 127 and 192) where undesirable air leakage is likely.

The jet of water can form an angle between 0 and 90° with a vertical plane across the fore and aft direction of the single hull, but should preferably be 60–70°. The large amount of momentum of the water blown out has a local effect on the direction of flow in the supporting sir cushion, and inhibits its deflection forward, when the step goes out of the water and there is a risk of air leakage. In the same way, an arrangement of water or air locks along the bilge keels 20 hinders leakage of sir along the sides of the hull. The invention will preferably be used in a seaway, and in other conditions it will be possible to shut it off.

This arrangement is easier to install with the recommended air cushion chamber 9 design than it is on conventional hovercraft, due to the proportionately smaller dimensions of the air cushion chamber 9 and the fact that the air cushion chamber 9 containment comprises a rigid construction, instead of completely or partially flexible skirts.

In an alternative embodiment, air is used instead of water, which consequently produces an air lock, which in other respects has the same design and function as describe above.

Figure 8:
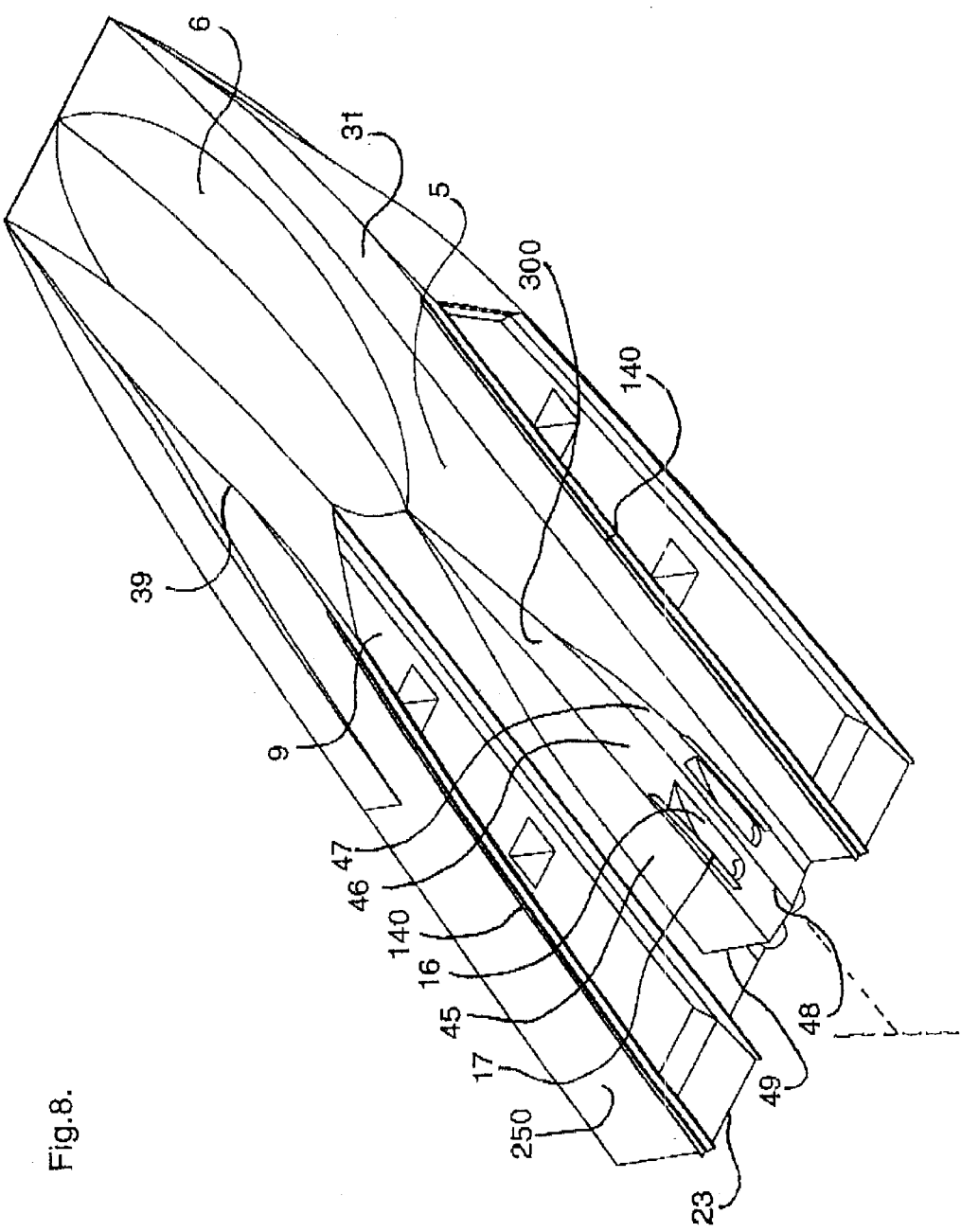
FIG. 8 shows a perspective view of a second embodiment of the invention having a separate, symmetrical propulsion hull positioned between the single hulls, and in which the single hulls are asymmetrical.

FIG. 8 shows the recommended design of a separate, symmetrical propulsion hull 300, placed between the single hulls, and in which the single hulls are asymetrical.

The propulsion hull, primarily intended far water jet propulsion, is positioned as a separate propulsion hull 300, between the (preferably) asymmetrical single hulls 250 in the vessel's line of symmetry. This propulsion hull 300 has two planing bottom surfaces 46 and 47, connected to one another in a fore and aft plane of symmetry 48, two side surfaces 45, which are connected to the bottom surfaces 46 and 47 and which form an acute angle with an arbitrary vertical plane, and a transom surface 49, which is a transverse plane in relation to the vessel's fore and aft direction. The propulsion hull is connected to the wet deck 5.

In an alternative embodiment, in which the relative speed is low in terms of generating dynamic lift and/or in which the length of the propulsion hull is dominant in comparison with the air cushion hulls and/or in which it is judged that the shape of the propulsion hull can reduce the vessel's motion and acceleration in waves, the propulsion hull alternative can be of round bottom type.

The fore and aft position of the separate propulsion hull relative to the side hulls well follow the guidelines mentioned above for side positioned propulsion hulls. In an alternative application the center located propulsion hull may have a width equal to the distance between the inner sides of the air cushion single hulls, and be longer than the air cushion single hulls, and extend beyond one or both ends of the single hull. Thereby the sides of the center propulsion hull will in practice be equal to the inner sides of the air cushion single hulls; and the bottom surfaces of the bow part of the center propulsion hull will be connected to the fore bottom surfaces of each air cushion single hull.

Strips 140 for deflecting water that flows along the side of the hull can be attached to both the inner side and outer side of the air cushion hull sections. They will run along the vessel from around the position of the step at the outer and/or inner side of the single hull section to the transom.

Figure 9:
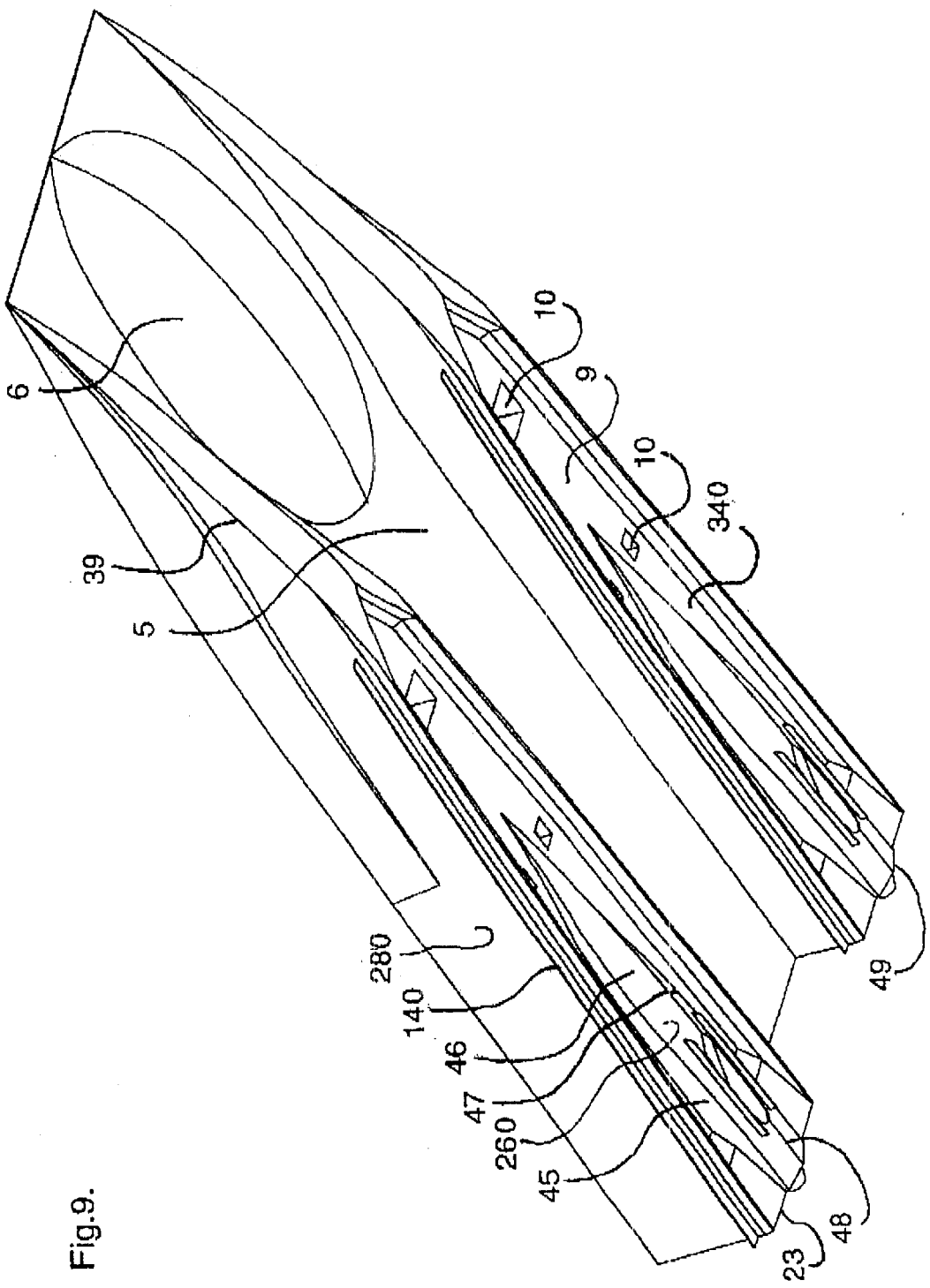
FIG. 9 shows a perspective view of a third embodiment of the invention having propulsion hulls located inside the air cushion chambers in a symmetrical catamaran configuration.

FIG. 9 shows the arrangement of propulsion hulls 260 inside the air cushion chamber 9, for a catamaran with symmetrical air cushion hulls 280. The propulsion hull 260, designed for water jet propulsion, is put inside the air cushion chamber 9 of a, preferably, symmetrical single hull 280, and preferably in or near the line of symmetry of this single hull. This propulsion hull 260 comprises two planing bottom surfaces 46 and 47, connected to one another in a fore and aft plane of symmetry 48, two side surfaces 45, which are connected to the bottom surfaces 46 and 47, and which form an acute angle with an arbitrary vertical plane, and a transom surface 49 that is a transverse plane relative to the fore and aft direction of the vessel.

The propulsion hull is connected to the ceiling of the air cushion chamber 9. The fore and aft positioning of the propulsion hull in relation to the side hull will follow the above guidelines for propulsion hulls between the single hulls or connected to the inner sides of the single hulls, with the exception that the transom should be in a fore and aft position, which is in or near the transom 23 of the single hull.

When the fore and aft length of the propulsion hull is such that it divides the surrounding air cushion chamber into two side chambers, with no connection between them, each air cushion chamber must be supplied by one or more separate fans 10, with a control system that permits individual regulation of pressure and volume flow, in order to inhibit the operation of one fan affecting the operation of another. In the above case, if there is air leakage from one side, the air pressure in the other side is maintained. This situation is particularly applicable when the angle of roll of the vessel is large, as can be the case for a monohull in side waves.

FIG. 10 shows a recommended arrangement for collecting air that leaks from the air cushion chamber 9, in order to inhibit air entering the propulsion unit. The arrangement is shown for a catamaran with asymmetrical air cushion hulls in combination with internal propulsion hulls 3.

Between each propulsion hull 3 and the side 701 of the corresponding single hull that faces the propulsion hull, a groove 62 is formed, which runs from near the fore edge 702 of the propulsion hull and aft along its entire length. The purpose of the groove is to catch air that leaks from the air cushion 9 over the underside of the nearby side keel on the single hull 20 and, if the propulsion is supplied by a water jet unit, lead the air aft past the unit's water inlet 16, in order to inhibit air from entering the unit. The cross-sectional area of the groove can be triangular, rectangular or arched. The lower part of the sides 61 and 63 of the groove will be mainly vertical. The vertical side of the groove 63 that faces the single hull is principally formed by the outer side of the single hull, upwards from the lower edge of the side keel. The vertical side of the groove that faces the propulsion hull 61 forms an angle that is 90° in an athwartships section with the bottom of the propulsion hull. The lower edge of the vertical side of the groove facing the propulsion hull 620 can be lower than or the same height as the bilge keel 20 of the single hull. The height of the groove upwards from the underside of the single hull's side keel (vertical distance 620 to 621), in a fore and aft position at the water intake of the water jet propulsion unit 16, will from this point towards the stem be approximately the same size as the distance from the underside of the side keel 20 to the water surface when travelling at speed, when the vessel is supported by the air cushion, and from that s point towards the bow, gradually decrease in depth.

The changes in the draught of an air cushion borne vessel vary less with changes in load than for a displacing hull, because the pressure of the air cushion can be varied to a certain extent, in order to balance the weight of the vessel. The combination of water jet to unit and air cushion vessel is natural, in so much as the resistance of the propulsion hull is at a minimum within a limited draught range.

FIG. 11 shows the basic combinations of symmetrical or asymmetrical air cushion hulls with propulsion hulls, for monohull and catamaran vessels.

The positioning of the water intake of the water jet unit, and thus of the propulsion hull(s), will preferably also be as near as possible to the center line of the vessel, as the roll component of the vertical motion is at a minimum there. This gives rise to variants of the original concept described above, comprising a catamaran with asymmetrical air cushion hull sections, with the propulsion hulls positioned at their inner sides. The following variants are possible, but this does not exclude other variants in which the idea of the invention is applied:

Catamaran with symmetrical single hulls and with propulsion hulls positioned at their inner sides and/or propulsion hulls located inside each cushion chamber.

Monohull vessel with propulsion hulls connected to either side of the single hull and/or with propulsion hull located inside the cushion chamber Trimaran, with asymmetrical or symmetrical or a combination of asymmetrical and symmetrical single hulls, the same or different lengths, and with propulsion hulls that are the same or different lengths as one another and/or the single hulls, connected to both sides of the single hull in the center (two propulsion hulls) and/or with propulsion hulls located inside the cushion chamber Trimaran hull as in the previous example, and with propulsion hulls connected to either side of the single hull in the center, and to the inner side of each of the outer single hulls (four propulsion hulls) and/or with propulsion hulls located inside each cushion chamber Trimaran hull as in the previous example, and with propulsion hulls connected to each side of the single hull in the center and to both sides of each of the outer single hull (six propulsion hulls) and/or with propulsion hulls located inside each cushion chamber (0–3 propulsion hulls)

Trimaran hull as in the previous example, and with propulsion hulls connected to both sides of each of the outer single hulls (four propulsion hulls) and/or with propulsion hulls located inside each cushion chamber (0–3 propulsion hulls)

Trimaran hull as in the previous example, and with propulsion hulls connected to the inner side of each of the outer single hulls (two propulsion hulls) and/or with propulsion hulls located inside each cushion chamber (0–3 propulsion hulls)

Trimaran hull as in the previous example, and with propulsion hulls connected to the outer side of each of the outer single hulls (two propulsion hulls) and/or with propulsion hulls located inside each cushion chamber (0–3 propulsion hulls)

The propulsion hulls should preferably be positioned between the single hulls, in order to benefit from the higher static pressure and the resulting higher wave elevation that is usually caused by the hull interference. Higher wave elevation creates a greater margin against air entering from the atmosphere into the water intake of the water jet unit. Higher pressure at the water intake increases the propulsion efficiency of the water jet unit.

Locating the propulsion hulls on the outer sides of the outer single hulls should be seen as a supplement to other propulsion hulls, preferably to be used when travelling in a moderate seaway.

Another variant of the trimaran comprises two outer single hulls, symmetrical or asymmetrical, with a hull positioned in the center of the vessel, with its length the same as or different from the outer single hulls and comprising just one propulsion hull. This is done by a combination of two propulsion hulls of the design described previously, for connecting to one side of a single hull, and forms a symmetrical, planing hull placed in the center line of the vessel and containing one or more water jet units for propelling the trimaran. This solution is basically the same as described previously, e.g. a catamaran with a separate propulsion hull positioned between the single hulls.

The above basic description of combinations of one, two and three single hulls, and with alternative positions and designs of propulsion hulls, and volume bodies under the wet deck between the single hulls, is extended to include four or more symmetrical or asymmetrical, or a combination of symmetrical and asymmetrical, single hulls, with the single hulls the same or different lengths, in combination with propulsion hulls, the same length as or a different length from the single hulls, designed for connecting to one or both sides of each single hull or designed as a number of separate propulsion hulls, positioned between or designed for connecting to all or a number of the single hulls, and/or propulsion hulls located inside the air cushion chamber of all or a number of the single hulls, in all possible permutations as described above for a single air cushion hull (monohull), two air cushion hulls (catamaran) and three air cushion hulls (trimaran).

To summarize, the invention comprises a vessel hull with one or more single hull sections, exemplified by a catamaran hull comprising two single hull sections that are asymmetrical around a fore and aft axis, connected together with a deck structure; and the weight of which is borne mainly by an air cushion under each single hull, which is confined within an air cushion chamber and at the transom is controlled by one or more athwartships flap(s); and in which the pressure and air supply for the air cushion are generated by one or more fans, in combination with dynamic lit) when travelling at speed on a planing, surface positioned fore of the air cushion chamber and on the aft flap; and fitted with two propulsion hull sections, each of which contains water jet units or some other suitable system for propelling and maneuvering the vessel, and in which the propulsion hull sections referred to are each connected to the inner sides of the respective single hull sections.

The air cushion hull section of a preferred embodiment of the invention is also characterized by the fact that: in a side view, the profile of the bottom edge (stem contour) of the fore planing surface will form an angle with the profile of the boundary line of the step, and with the water surface when travelling at speed. This angle will normally be greater than 3° and less than 12°, but preferably around 8–10°.

An arbitrary athwartships section through the lowest of the forebody hull surfaces will form an angle that is at least 25° with the horizontal plane. This angle will preferably be the same size on either side of bath a symmetrical and an asymmetrical single hull, but can also, within the above limits, be different on either side of the single hull.

The air cushion chamber will be contained against the fore planing bottom surface of a step, which can be arrow-shaped or bow-shaped in its planform. In a side view, all points on the boundary line of the step, whatever their plan farm, will be in the same plane, which at speed should be parallel to or form a small angle with the undisturbed water surface.

Around the air cushion chamber, the air cushion will be contained by rigid side planes, which, when the vessel is running under stationary conditions, should penetrate the water surface and inhibit or limit leakage from the air cushion.

In a preferred embodiment, the length of the air chamber from the transom to the step will make up around 70% (65–75%) of total length of the hull between the transom and bow, but can, while retaining its function, be between 45 and 85% of the length of the hull.

The plan form of the air chamber will be chosen such that the intended proportion of the weight of the vessel is borne by the air cushion, and its pressure center, together with the lift from the planing surfaces, balances the fore and aft position of the center of gravity, in order to achieve a constant position in the water at speed.

The plan form of the cushion chamber will preferably be designed such that it is wider at the transom than at the step, in order to move the position of the center of the resulting upward motion aft, and better match it to the fore planing section of the single hull, the width of which should be limited, in order to reduce hydrostatic and hydrodynamic forces in waves.

In its aft section, the air cushion chamber will be bounded by a planing surface formed by one or more flat or curved, concave or convex, surfaces, the aft end/s of which is/are at or near the vessel's transom. The latter planing surface (surfaces) will preferably be adjustable in angle around a horizontal, athwartships axis, at the fore edge of the surface, and which is connected to the aftermost section of the air cushion; chamber. The mean chord of a vertical fare and aft section through the surface, between the pivot point and aftermost edge, forms an angle with a horizontal plane, the value of which can be chosen and varied from 0° to 25°. The position of the surface can be fixed, be adjustable to set positions or be part of a motion control system, by which its angle and angular velocity are adjusted, depending on the dynamic behavior of the vessel. The fore planing surface, the air cushion and the aft flap form a system for balancing the position of the upward force, and for passive and/or active hydrodynamic damping of the vessel's motion in waves.

The side boundary lines of the plan form of the cushion chamber (the side keels) should preferably be convex outwards from the center line of the single hull, but can also be formed by straight lines that for a symmetrical single hull both, and for an asymmetrical single hull one or both, form an angle with the center line, so that the distance between them is greater at the aft edge of the cushion chamber than at its fore edge.

The width of the single hull's air chamber, measured between the inner sides of the lower edge of the bilge keels, in relation to the maximum total width of the single hull at the same athwartships section, will be able to vary between 0% in the foremost section of the air cushion chamber, where its horizontal elevation is arrow-shaped or bow-shaped, to nearly 100% in a section at the transom.

The shape of the underside of the fore and aft side containment surfaces of the air chamber, the side keels, seen in side view, will be matched to the shape the air cushion containment surface takes when operating stationary in the vessel's design configuration.

The volume and dimensions of the air cushion chamber will be matched to the performance of the fans, so that air leakage from the air chamber is controlled, and takes place mainly at the transom.

The propulsion hull section of this vessel is characterized in that the propulsion hull will have a length between 10 and 100% of 26 the length of the air cushion hull.

Each outer side of each single hull that is not connected to a nearby propulsion hull may be arranged with air lubrication, using air collected from the air cushion chamber, and where the pressure of the air cushion is used to force out the air.

While this invention has now been particularly shown and describe with references to preferred embodiments thereof, it will be understood by those skilled in the art that various changes in form and details may be made therein without departing from the scope of the invention encompassed by the appended claims.

What is claimed is:

1. A high-speed marine vessel having at least one hull wherein, the weight of the vessel is supported by at least two of planing surfaces, displacing volumes, pressurised air cushions and surfaces being affected by aerostatic and aerodynamic pressure at high-speeds and further comprising cushion chambers, each of which opens only downwardly, a step that extends inwardly from each hull bottom so that a first plane defined by the step separates at least one of the hulls into a planing and displacing portion extending forward of the first plane and a pressurized air cushion portion extending rearward, such that every point of an edge of the step in the first plane is substantially at the same vertical height relative to the undisturbed water surface when the vessel is under way, a rearward enclosure arrangement defining a second plane between longitudinal sidewalls, an air cushion chamber ceiling, and the water surface, where the lower part of said second plane has a vertical location of up to 30% of the distance from the hull bottom to the air cushion chamber ceiling, said lower part of said second plane, which may be adjustable, further defining an angle with the water plane of up to 20° when the vessel is under way, said angle being measured over a minimum horizontal length representing at least 10% of the total length of the hull for vessels with length below 30 meters and at least 4% for vessels with length above 30 meters, the length of each air cushion chamber from a transom to a middle point between a foremost point and a rearward point of the step making up between 45% and 85% of the total length of the hull between the transom and bow, and wherein in a side view, the profile of the underside of the planing and displacing surface as measured over a horizontal distance from the middle point between the foremost point and the rearward point of the step is at least 30% of the distance from said middle point up to the bow, said profile defining a boundary line forming an acute angle with the water surface at speed, said air cushion chamber having an increasing athwartships width towards the transom, the average increase in width, defined by an angle measured from the middle point between the foremost point and the rearward point of the step to the transom is less than 20°, as the angle measured between a vessel centre line and respective sides of a side hull at the water level when the vessel is under way, and wherein an arbitrary athwartships section through the lowest of the forebody hull surfaces forms an average angle with the horizontal plane of at least 25°, the vessel further comprising at least one displacing and planing multifunction propulsion body, wherein the length of each propulsion body relative to the overall length of the vessel is between 10% and 100%, such that the vessel may achieve a desired positioning of the centre of upward directed forces in relation to the centre of gravity.

2. The vessel of claim 1, wherein the acute angle between the planing and displacing surface and the boundary line, measured over a horizontal distance from the middle point between the foremost point and the rearward point of the step and at least 30% of the distance from said middle point towards the bow is up to 12°, measured both sides of the water line.

3. The vessel of claim 1, wherein each propulsion body is connected to a single hull facing the vessel centre line, respectively.

4. The vessel of claim 1, comprising a plurality of single hulls and wherein at least one propulsion body is arranged between said single hulls.

5. The vessel of claim 1, wherein at least one propulsion body section is connected to a single hull bottom within said air cushion chamber, respectively.

6. The vessel of claim 1, wherein each propulsion body comprises a water jet unit.

7. The vessel of claim 1, wherein said step of the air cushion chamber comprises a water lock which blows out water at high velocity and high density to limit unwanted ventilation from the air cushion.

8. The vessel of claim 1, comprising at least one aft flap that forms an adjustable angle with a horizontal plane in order to enclose the air cushion and to control the air ventilation from the aft part of the air cushion in order to balance the position of the upward forces.

9. The vessel of claim 1, comprising at least two single bulls which together define between them and a ceiling at least one longitudinal air tunnel with a cross section area which decreases in the aft direction of the vessel.

10. The vessel of claim 1, comprising a plurality of single hulls and a groove between the inner side of each single hull and the vertical side of a corresponding propulsion hull, and in which said groove collects air that leaks over the inner side of the side keel of each single hull.

* * * * *

UNITED STATES PATENT AND TRADEMARK OFFICE
CERTIFICATE OF CORRECTION

PATENT NO. : 6,672,234 B2
DATED : January 6, 2004
INVENTOR(S) : Arne Osmundsvaag It is certified that error appears in the above-identified patent and that said Letters Patent is hereby corrected as shown below:

Column 19,
Line 29, after "comprising" insert -- air --.

Column 20,
Line 48, delete "bulls" and insert -- hulls --.

Signed and Sealed this

Fourteenth Day of March, 2006

JON W. DUDAS
*Director of the United States Patent and Trademark Office*